United States Patent Office 3,013,574
Patented Dec. 19, 1961

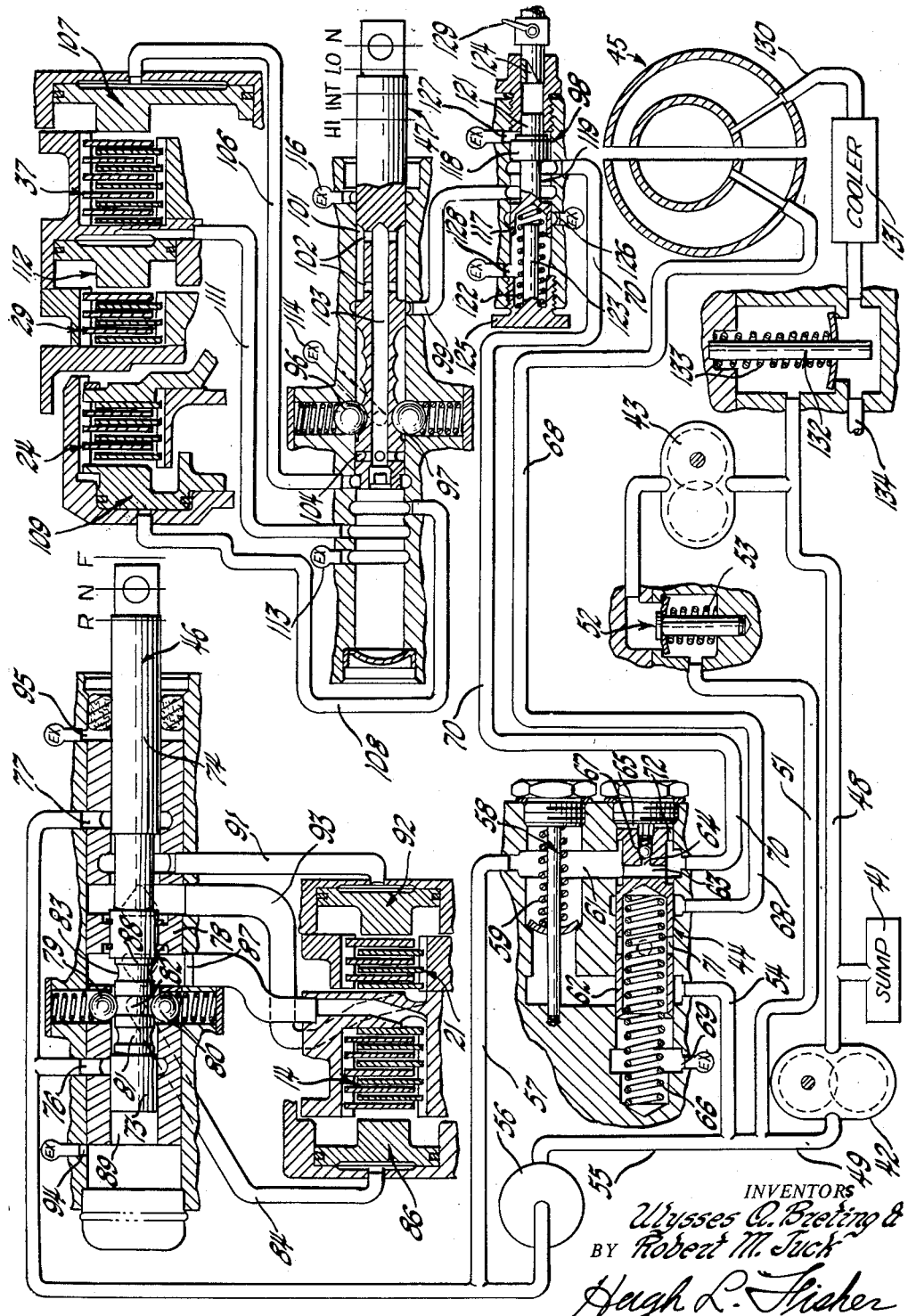

3,013,574
CONTROL SYSTEM
Ulysses A. Breting and Robert M. Tuck, Indianapolis, Ind., assignors to General Motors Corporation, Detroit, Mich., a corporation of Delaware
Original application Dec. 5, 1955, Ser. No. 551,068. Divided and this application Aug. 21, 1958, Ser. No. 756,509
8 Claims. (Cl. 137—115)

This invention relates to improvements in control systems of the character that are adapted, although not exclusively for use with transmissions.

The present invention was divided from application Serial No. 551,068, filed December 5, 1955.

In control systems, particularly for transmissions, pressure fluctuations often present problems in calibration. For example, if the engaging pressure with the various transmission clutches and brakes varies excessively during engagement it is difficult to obtain a proper engagement each time. Moreover, where the pressure employed to control other valves fluctuates, the regulating or modulating functions of these other valves are hindered.

With this problem in mind the invention contemplates provision of a control system wherein pressure regulation is accomplished in a novel way so as to eliminate pressure fluctuations during regulation. Specifically, a pressure regulating valve is constructed so that the tendency for the valve to move rapidly during regulation, which produces undesired pressure fluctuations, is controlled.

Another concern in control systems which require a fluid filter is the exhaust of filtered fluid during regulation of the system pressure. The reason for this is that the life of a conventional filtering unit is necessarily limited, and therefore, much of the life is wasted when filtered fluid is exhausted during the continuous pressure regulation.

Accordingly, the invention seeks to provide a unique pressure regulating arrangement which exhausts unfiltered fluid during operation without interfering with the regulating functions of the arrangement.

The foregoing and other objects and advantages of the invention will be apparent from the following description and from the accompanying drawings, in which the single FIGURE is a schematic hydraulic control diagram for a transmission.

Referring to the FIGURE, the control system depicted includes a sump or reservoir 41 for providing a source of fluid that is pumped by either or both a transmission input shaft driven pump 42 and a transmission output shaft driven pump 43 at a pressure, determined by a pressure regulator valve 44, to a plurality of piston type servos that operate the clutch and brakes for a transmission (not shown) and also to a torque converter 45. A forward and reverse selector valve 46 controls a forward brake 21 and a reverse brake 14 while a ratio or range selector valve 47 controls a low speed brake 37, an intermediate speed clutch 24 and a high speed brake 29.

Both of the parallel connected pumps 42 and 43 receive their fluid supply from the sump 41 through a passage 48 and discharge into a main supply passage 49 connected directly to the discharge side of pump 42 and to the discharge side of pump 43 through a branch passage 51 including a check valve 52. A spring 53 and the discharge pressure of pump 42 in the conduit 51 coact to hold the check valve 52 closed preventing backflow from pump 42 when the vehicle is stationary and the pump 43 is consequently inoperative. Since the pump 43 is of the positive displacement type, check valve 52 will open as soon as fluid flow starts. From main supply passage 49, pressure fluid can proceed directly to the pressure regulator valve 44 through a by-pass 54 or through a main passage 55 having any suitable filtering means 56 and then to a passage 57. A relief valve 58 separates the two passages 54 and 57 by employing a spring 59 to maintain the relief valve 58 closed preventing fluid flow from by-pass 54 into an inlet port 61 open at all times to passage 57. The relief valve 58 serves as a safeguard for the system and is usually closed except for extreme conditions, for instance, when the filtering means 56 is obstructed or with very cold fluid which would flow with difficulty through the filtering means. When these extreme conditions occur, the relief valve 58 will open and continue to supply the inlet port 61 so that there is an assurance that, generally, pressure fluid will always be available in the inlet port 61 whether supplied from by-pass 54 or passage 57.

The pressure regulator valve 44 includes a bore having a valve plunger 62 slidable therein for admitting pressure fluid through the inlet port 61, a valve passage 63 and an axial valve passage 64 to pressure regulating chamber 65 in which fluid pressure urges the valve plunger 62 to the left against the restoring force of a regulator spring 66. The coaxial passage 64 has a spring biased check valve 67 which upon a predetermined pressure build up will open and admit pressure to the rear face of the valve plunger 62. As the plunger 62 moves to the left a torque converter feed passage 68 is first opened and then the by-pass 54 starts to open to a relief port 69 through a plurality of openings 71 in the plunger 62. During the operation of the pressure regulator valve 44, the valve plunger 62 will always keep inlet port 61 and an outlet passage 70 in open communication.

The arrangement of the pressure regulator valve 44 is advantageous since pressure fluid in the regulating or dash pot chamber 65 admitted by the ball check valve 67 will prevent rapid movement of the pressure regulator valve 44 to the right upon a decrease in pressure by the dash pot or retarding effect created by the trapped fluid, the only outlet being a relief opening such as a relief or vent 72 on a land of plunger 62 which vent could, of course, be in the valve body. Furthermore, with this arrangement pressure fluid in the by-pass 54 is exhausted directly to the relief port 69 so that unfiltered fluid is exhausted and the filtered fluid in the main passage 55 is transferred through pressure regulator valve 44 to the control system.

Pressure fluid proceeds through the port of passage 55 downstream from the filtering means 56 to the forward and reverse selector valve 46 which valve and its functions have been described in detail in the application of Howard W. Christenson, William G. Livezey and Ulysses A. Breting, S.N. 509,298, filed May 18, 1955. Briefly, in this transmission the valve, which is manually operated by any suitable device (not shown), controls fluid pressure supply to the reverse brake 14 and the forward brake 21 and comprises two end valve lands 73 and 74 with land 73 controlling inlet port 76 and land 74 controlling inlet port 77, a central land 78 of larger diameter, and a positioning detent including two oppositely disposed spring biased balls 79 and 80 riding in and adapted to conform with three annular grooves 81, 82 and 83 corresponding respectively to forward, neutral and reverse positions for the valve 46. When the valve 46 is moved to the left from the position illustrated, the balls 79 and 80 engage the groove 83 and inlet port 76 will supply pressure fluid through a feed passage 84 to operate a reverse servo 86 for engaging reverse brake 14 and through a brake lubrication passage 87 to cool and lubricate the brake 14. As valve 46 progresses to the left, brake lubrication passage 87 will be closed by land 78 and because land 78 is larger than land 73, the unbalanced pressure will resist this leftward movement and such resistance will be somewhat proportional to pressure build up in the passage 84 for the reverse brake 14, thus providing the operator with a "hydraulic feel." Upon continued movement of the valve 46, a land 88 will enter the bore 89 completely shutting off pressure fluid supply to the lubrication passage 87 and eliminating the "hydraulic feel" aspect. The operation of the valve 46 in supplying pressure fluid from inlet passage 77 to feed passage 91 for actuating a forward servo 92 that engages brake 21 and for supplying lubrication oil to its lubrication passage 93 is similar to that described in operating the reverse brake 14. Any leakage of fluid that occurs around the end areas of the valve 46 will drain to a pair of exhaust ports 94 and 95.

The range or ratio selector valve 47, adapted to be maneuvered manually by any suitable means (not shown), is illustrated in the neutral position and held by a positioning detent including two opposed spring biased balls 96 and 97 received by a plurality of conforming recesses corresponding to the various speed range positions of the valve 47, namely, neutral, low, intermediate and high, the sequence of positions the valve takes as it is moved to the left. When the valve 47 is moved to the first position, low speed, pressure fluid flows from passage 70 through a cutoff valve 98, an inlet passage 99, an annular groove 101 of the valve 47, a plurality of openings 102, an axial passage 103 to a plurality of openings 104 transverse to the axial passage 103. In the low speed position the openings 104 align with a passage 106 and supply pressure fluid to actuate a low speed servo 107 for applying the low speed brake 37. In the next position of the range selector valve 47, intermediate speed, openings 104 align with an intermediate clutch supply passage 108 to provide pressure fluid for actuating an intermediate speed servo 109 which then engages the intermediate speed clutch 24. In the next position, high speed, pressure fluid is supplied to a passage 111 for engaging by a high speed servo 112 the high speed brake 29. When valve 47 is not supplying pressure fluid through openings 104 to the servos then either a vent 113 or a vent 114 will always relieve fluid pressure in the other servos. An additional vent 116 exhausts leakage from around the end of the valve 47 to the sump 41.

A cutoff valve 98, disposed between the pressure regulator valve 44 and the range selector valve 47, controls the pressure fluid supply from passage 70 to the inlet passage 99 for the range selector valve 47. The cutoff valve 98 is of the piston type having two lands 117 and 118 with an intermediate reduced portion 119 and an end reduced portion 121. The land 117 includes a bore for receiving a compression spring 122 and a guide pin 123 slidable within the spring. As illustrated, the force of the spring 122 which holds cutoff valve 98 in an open position permitting free passage of pressure fluid between passages 70 and 99 is opposed by fluid pressure in a conduit 124 acting on the end area of the reduced portion 121. After the fluid pressure in conduit 124 reaches a predetermined value, the valve 98 will move so that land 118 will interrupt communication between passages 70 and 99 and land 117 will uncover an exhaust port 126 relieving inlet passage 99. At the cutoff position, the guide pin 123 limits valve travel to that which will not permit the reduced portion 121 to vent pressure fluid in conduit 124 to an exhaust port 127, the purpose of port 127 being as well as an exhaust port 128 for the relief of the adjacent areas of leakage fluid. The source of pressure fluid in the conduit 124 is associated with the vehicle brakes hydraulic system in a manner that, upon actuation of the brakes, pressure fluid will be admitted to the conduit 124 and cause actuation of the cutoff valve 98 to the cutoff position for rendering the servos 107, 109 and 112 inoperative to establish drive through the transmission. Preferably this pressure fluid in the conduit 124 is the same fluid that is employed to actuate the vehicle brakes. It is manifest that the cutoff point will be determined by the relationship of the spring 122 to the pressure in conduit 124 and therefore the spring force may be varied, as by an adjusting plug 125, so that a partial application of the brakes will actuate the valve or if desired, a full application may be required to actuate the valve 98. Furthermore, a shutoff valve 129 of any well known type may be employed to eliminate the influence of pressure fluid in conduit 124 so that the cutoff valve 98 will only operate when desired.

The torque converter 45 is supplied pressure fluid by the converter feed passage 68 and drains to an outlet passage 130 that includes a cooler 131 of any suitable construction, and which passage terminates at a relief valve 132 biased to the closed position by spring 133. The drainage fluid in outlet passage 130 is transferred by a lubrication passage 134 to the transmission for lubricating the working parts. When the pressure builds up to a predetermined value in lubrication passage 134, the spring 133 will be compressed and the relief valve 132 opened permitting the excess fluid to flow back into the passage 48, connected to the sump 41.

In operation, the operator first moves the forward and reverse selector valve 46 to either the forward or reverse drive position, determined by whether he wishes the vehicle to move forwards or backwards, and then by maneuvering the range selector valve 47 to any one of the three available drive positions, high, intermediate or low, he can establish a suitable speed ratio. With a lift truck as an example, when the operator applies the vehicle brakes, the cutoff valve 98 will neutralize the transmission permitting use of the power for operating the lift fork. This eliminates the necessity of moving either the range selector valve 47 or the forward or reverse selector valve 46 to neutral for interrupting drive through the transmission.

We claim:
1. A pressure regulating valve comprising, in combination, a valve body having a bore, a pressure regulating chamber at one end of said bore and a plurality of spaced ports in said bore including inlet, outlet, and exhaust ports, a valve slidable in said bore, said valve being arranged so that in sliding in said bore communication between said inlet and exhaust ports is varied thereby regulating and maintaining the pressure of fluid delivered to said outlet port at a predetermined value, a control passage connected between said inlet port and said pressure regulating chamber, said chamber being so arranged relative to said valve that fluid pressure in said chamber and delivered thereto by said control passage will urge said valve in one direction and will oppose movement in the other direction, a one-way valve means in said control passage for permitting inflow only to said pressure regulating chamber, a restricted passage for relieving said pressure regulating chamber, and a biasing means for urging said valve in said other direction.

2. A pressure regulating valve comprising, in combination, a valve body having a bore, a pressure regulating chamber at one end of said bore, and a plurality of spaced ports in said bore including inlet, outlet and exhaust ports, a slidable valve in said bore, the valve including a valve passage in communication with said bore for conducting pressure fluid to said pressure regulating chamber, said pressure regulating chamber being so arranged relative to said valve that fluid pressure in said chamber and delivered thereto by said valve passage will urge said valve in one direction and oppose movement in an opposite direction, a one-way valve means in said valve passage permitting inflow only to said pressure regulating chamber, a restricted passage for relieving said regulating chamber, and a biasing means for urging said valve in said opposite direction, said valve being adapted to regulate pressure by movement between said inlet port and said exhaust port so as to cause excess pressure to be relieved through said exhaust port.

3. A pressure regulating valve comprising, in combination, a valve body having a bore, a pressure regulating chamber at one end of said bore, and a plurality of spaced ports in said bore including an inlet port, an outlet port, an exhaust port, and a by-pass port, and passage means interconnecting said inlet and by-pass ports, a slidable valve in said bore including an annular recessed portion, a transverse passage through said recessed portion and an axial passage interconnecting said transverse passage with said pressure regulating chamber for transmitting pressure fluid to said chamber, said chamber being so arranged relative to said valve that fluid pressure in said chamber and delivered thereto by said axial passage will urge said valve in one direction and oppose movement in an opposite direction, one-way valve means disposed in one of said passages so as to permit inflow only to said pressure regulating chamber, a restricted passage for relieving said pressure regulating chamber, a biasing means for urging said valve in said opposite direction, said valve being adapted to regulate pressure by movement between said by-pass port and said exhaust passage so as to cause excess pressure in said by-pass port to be relieved through said exhaust port and thereby cause passage of regulated pressure fluid from said inlet port to said outlet port.

4. A pressure regulating valve comprising, in combination, a valve body having a bore, a pressure regulating chamber at one end of said bore, and a plurality of spaced ports in said bore including an inlet port, an outlet port, an exhaust port and a by-pass port, and passage means interconnecting said inlet and by-pass ports, a slidable valve in said bore including an annular recessed portion, a transverse passage through said recessed portion and an axial passage interconnecting said transverse passage with said pressure regulating chamber for transmitting pressure fluid from the inlet port to said chamber, said chamber being so arranged relative to said valve that fluid pressure in said chamber and delivered thereto by said axial passage will urge said valve in one direction and oppose movement in an opposite direction, a one-way valve means in said control passage for permitting inflow only to said pressure regulating chamber, and a restricted passage for relieving said pressure regulating chamber, said valve being adapted both to regulate pressure by movement between said by-pass port and said exhaust port and so as to cause excess pressure in said by-pass port to be relieved through said exhaust port and thereby cause passage of regulated pressure fluid from said inlet port to said outlet port.

5. A pressure regulating valve comprising, in combination, a valve body having a bore, a pressure regulating chamber at one end of said bore, and a plurality of spaced ports therein including an inlet port, an outlet port, an exhaust port, and a by-pass port, and passage means interconnecting said inlet and by-pass ports, a slidable valve in said bore including a through passage from said inlet port for conducting pressure fluid to said pressure regulating chamber, said chamber being so arranged relative to said valve that fluid pressure in said chamber and delivered thereto by said valve passage will urge said valve in one direction and oppose movement in an opposite direction, a check valve in said control passage permitting inflow to said pressure regulating chamber only, a restricted passage in said valve for relieving said pressure regulating chamber to said outlet port, and spring means for urging said valve in said opposite direction, said valve being adapted to regulate pressure by movement between said by-pass port and said exhaust port so as to cause excess pressure in said by-pass port to be relieved through said exhaust port and thereby cause passage of regulated pressure fluid from said inlet port to said outlet port.

6. A pressure regulating valve comprising, in combination, a valve body having a bore therein and a plurality of spaced ports in said bore including an inlet port, an outlet port, an exhaust port and a by-pass port, and passage means interconnecting said inlet and by-pass ports, filtering means disposed in said passage means for filtering pressure fluid supplied to said inlet port only, and a valve slidable in said bore, said valve being so arranged that in sliding in said bore communication between said by-pass and exhaust ports is varied thereby regulating and maintaining the pressure of fluid delivered from said inlet port to said outlet port at a predetermined value, said valve during regulation relieving unfiltered pressure fluid in said by-pass port to said exhaust port.

7. A pressure regulating valve comprising, in combination, a valve body having a bore therein, a pressure regulating chamber at one end of said bore and a plurality of spaced ports in said bore including an inlet port, an outlet port, an exhaust port and a by-pass port, and passage means interconnecting said inlet and by-pass ports, filtering means disposed in said passage means for filtering fluid supplied to said inlet port only, a valve slidable in said bore, said valve being so arranged that in sliding in said bore communication between said by-pass and exhaust ports is varied thereby regulating and maintaining the pressure of fluid delivered from said inlet port to said outlet port at a predetermined value, a control passage connected between said inlet port and said pressure regulating chamber, said chamber being so arranged relative to said valve that fluid pressure in said chamber and delivered thereto by said control passage will urge said valve in one direction and will oppose movement in the other direction, one-way valve means in said control passage for permitting inflow only to said pressure regulating chamber, a restricted passage for relieving said pressure regulating chamber, and a biasing means for urging said valve in said other direction, said valve during regulation relieving unfiltered pressure fluid in said by-pass port to said exhaust port.

8. A pressure regulating valve comprising, in combination, a valve body having a bore therein, a pressure regulating chamber at one end of said bore and a plurality of spaced ports in said bore including an inlet port, an outlet port, an exhaust port and a by-pass port, and passage means interconnecting said inlet and by-pass ports, filtering means disposed in said passage means for filtering fluid supplied to said inlet port only, a valve slidable in said bore and including an annular recessed portion, a transverse passage through said recessed portion, and an axial passage interconnecting said transverse passage with said pressure regulating chamber for transmitting pressure fluid to said chamber, said chamber being so arranged relative to said valve that pressure fluid in said chamber and delivered thereto by said axial passage will urge said valve in one direction and oppose movement in an opposite direction, said valve being so arranged that in sliding in said bore communication between said by-pass and exhaust ports is varied thereby regulating and maintaining the pressure of the fluid delivered from said inlet port to said outlet port at a predetermined value, one-way valve means in said control passage for permitting inflow only to said pressure regulating chamber and a restricted passage for relieving said pressure regulating chamber, said valve during regulation relieving unfiltered pressure fluid in said by-pass port to said exhaust port, and permitting transferral of regulated filtered pressure fluid from said inlet port to said outlet port.

References Cited in the file of this patent

UNITED STATES PATENTS

| | | |
|---|---|---|
| 2,474,772 | Ashton | June 28, 1949 |
| 2,548,160 | Hunter | Apr. 10, 1951 |
| 2,661,766 | Adams | Dec. 8, 1953 |

FOREIGN PATENTS

| | | |
|---|---|---|
| 120,443 | Australia | Oct. 4, 1945 |